Figure 8:
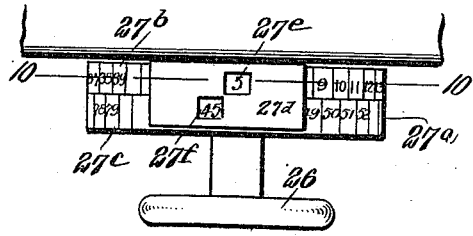

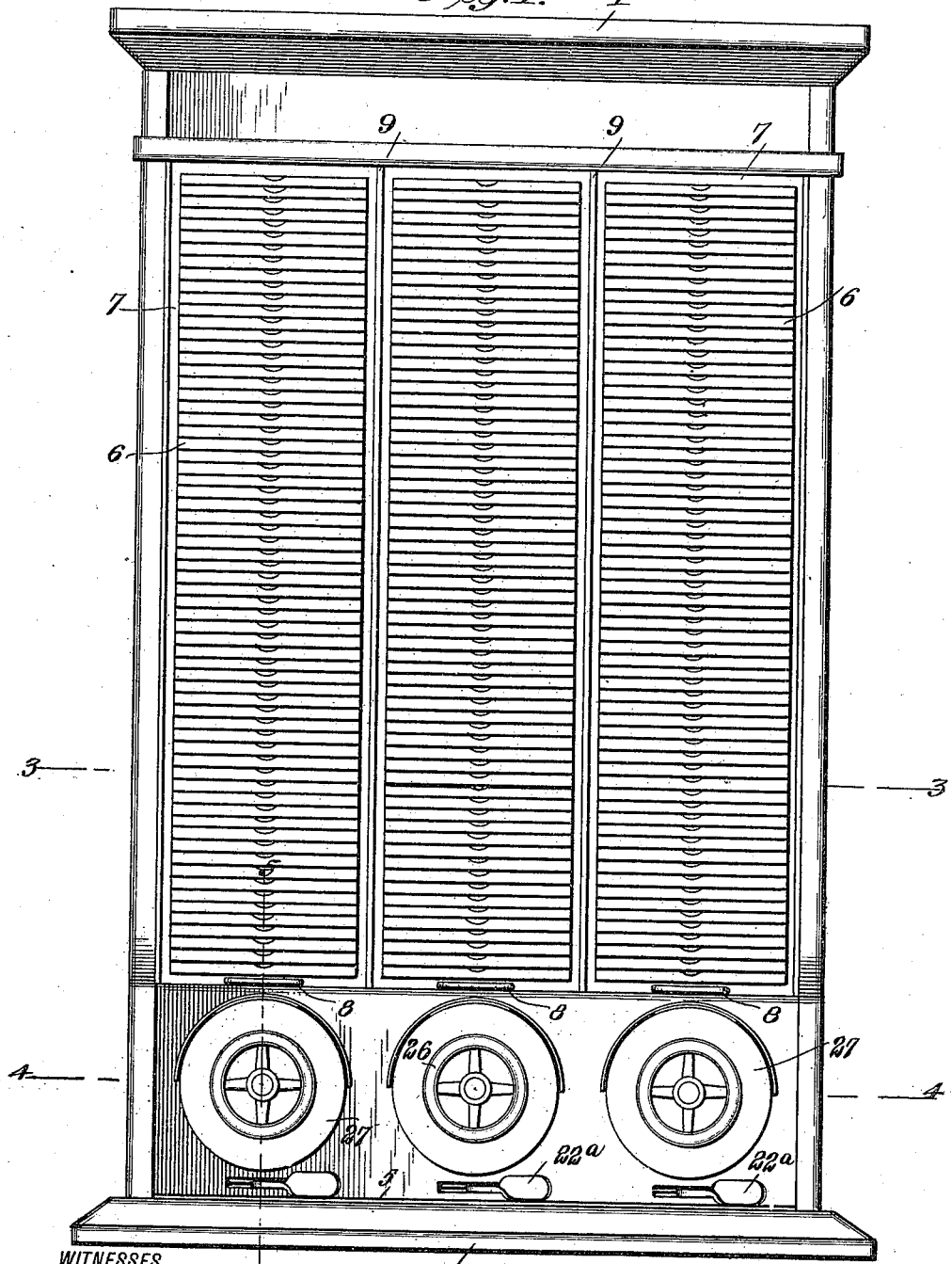

W. A. HARRIS.
FILE CABINET.
APPLICATION FILED AUG. 30, 1909.
974,663.
Patented Nov. 1, 1910.
5 SHEETS—SHEET 2.
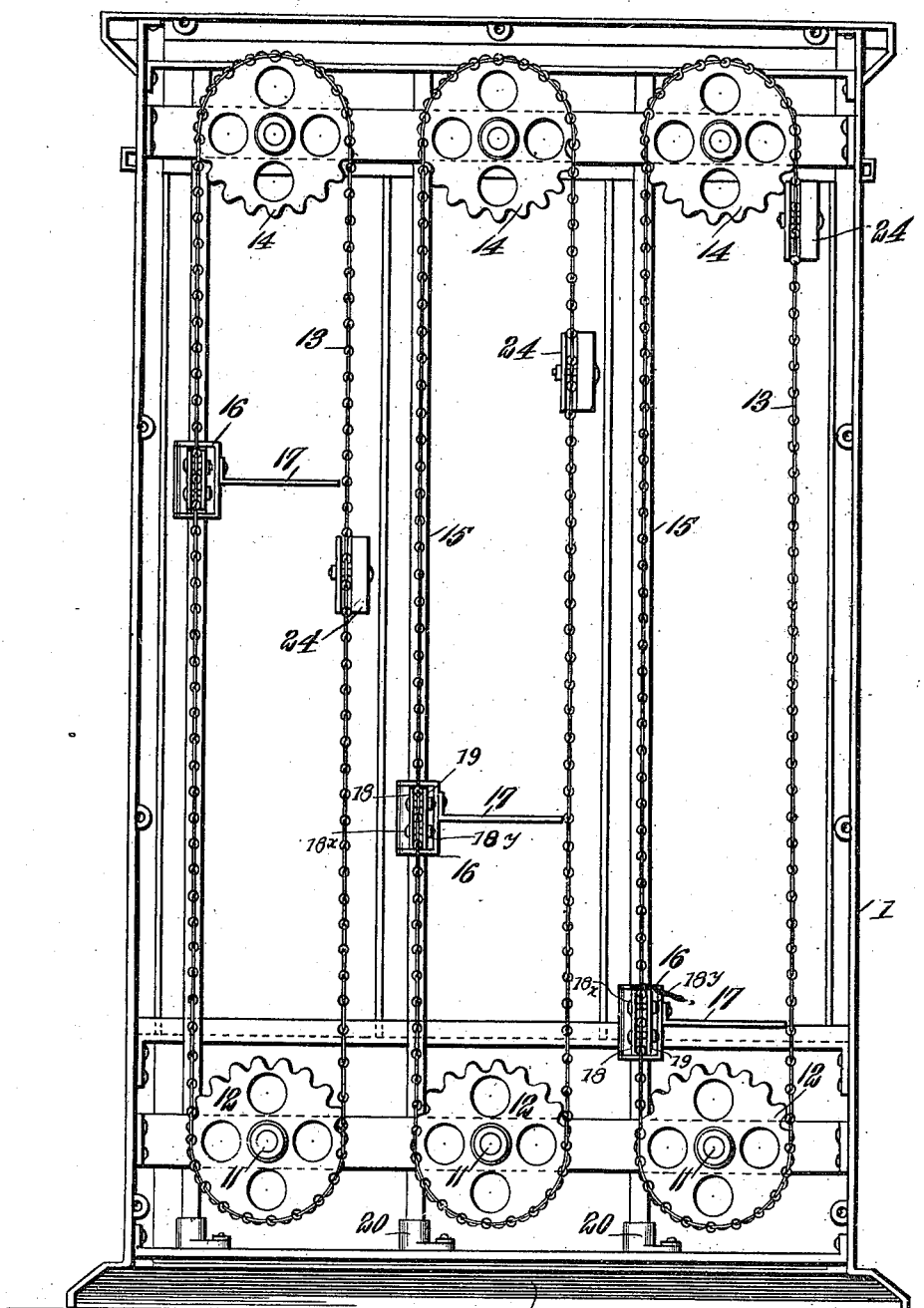
WITNESSES
INVENTOR
WILLIAM A. HARRIS
BY
ATTORNEYS

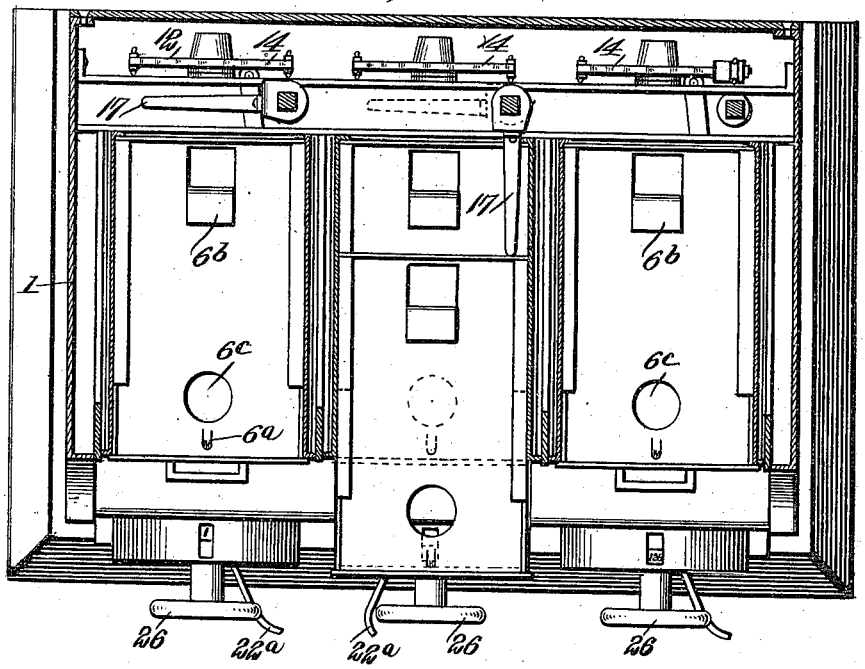
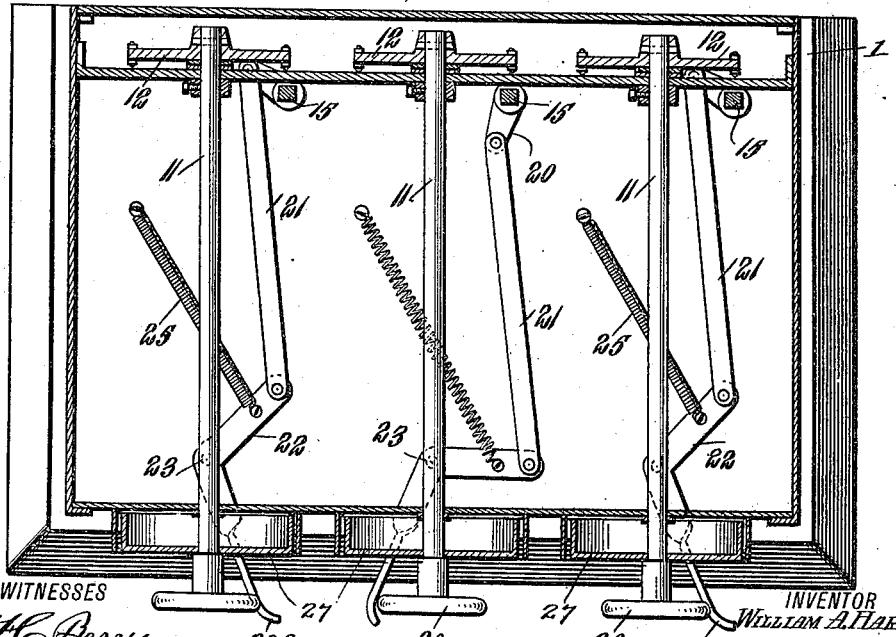

W. A. HARRIS.
FILE CABINET.
APPLICATION FILED AUG. 30, 1909.
974,663.
Patented Nov. 1, 1910.
5 SHEETS—SHEET 4.
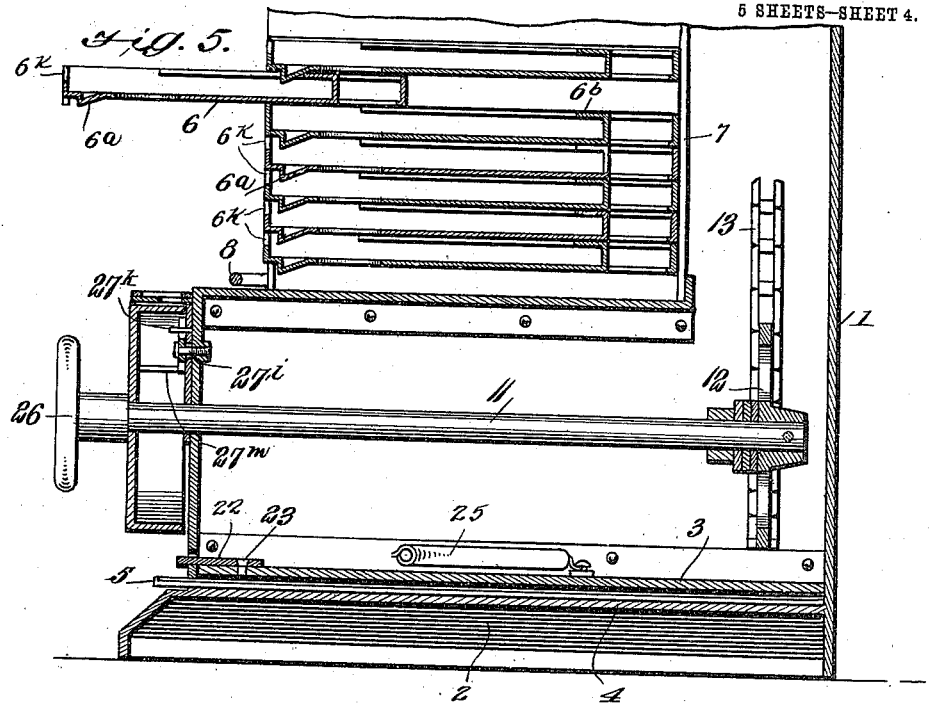
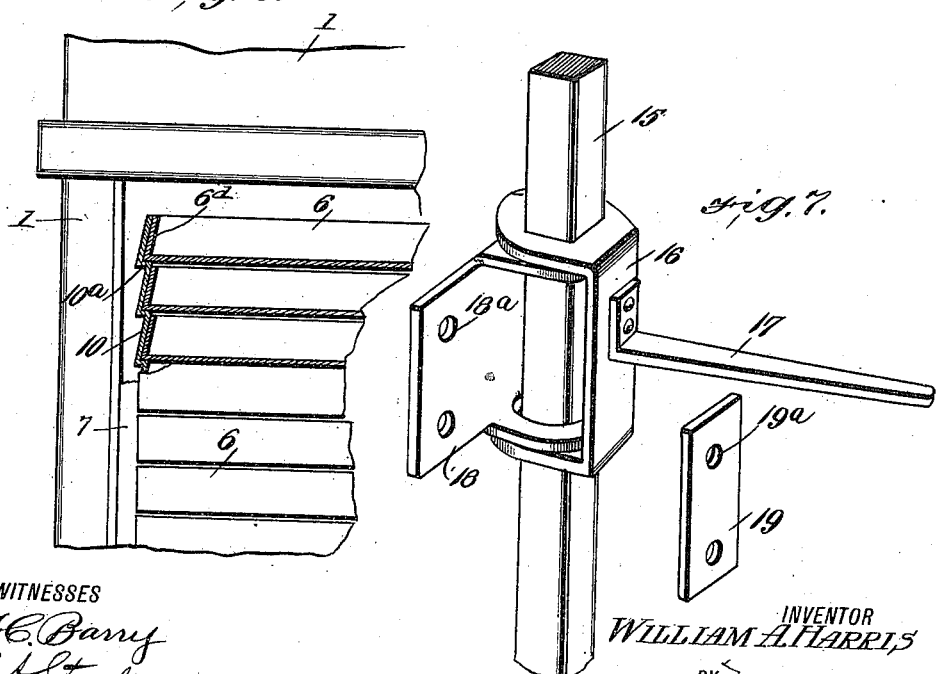
WITNESSES
F. C. Barry
L. F. Stanley
INVENTOR
WILLIAM A. HARRIS
BY Munn & Co.
ATTORNEYS

W. A. HARRIS.
FILE CABINET.
APPLICATION FILED AUG. 30, 1909.

974,663.

Patented Nov. 1, 1910.
5 SHEETS—SHEET 5.

WITNESSES
F. E. Barry
L. A. Stanley

INVENTOR
WILLIAM A. HARRIS
BY Munn & Co.
ATTORNEYS

UNITED STATES PATENT OFFICE

WILLIAM A. HARRIS, OF GREENVILLE, SOUTH CAROLINA, ASSIGNOR TO GEORGE W. TAYLOR, OF GREENVILLE, SOUTH CAROLINA.

FILE-CABINET.

974,663.  Specification of Letters Patent.  Patented Nov. 1, 1910.

Application filed August 30, 1909. Serial No. 515,189.

*To all whom it may concern:*

Be it known that I, WILLIAM A. HARRIS, a citizen of the United States, and a resident of Greenville, in the county of Greenville and State of South Carolina, have invented certain new and useful Improvements in File-Cabinets, of which the following is a specification.

My invention relates to cabinets for accounts, and it consists in the combinations, constructions and arrangements herein described and claimed.

An object of my invention is to provide a device which will hold the daily sales-slips, or bills, such as are commonly used in grocery stores, markets, and the like, in such a manner that they may be readily accessible so that the separate account of each customer may be kept without the necessity of the ordinary book-keeping system.

A further object of my invention is to provide a cabinet in which each customer's sales slips are kept in a separate drawer which may be opened by mechanism in response to pressure upon a single lever, after setting the number wheel, which corresponds with the customer's number.

A further object of my invention is to provide a number wheel having two rows of consecutive numbers which may be revolved to bring the numbers of one row in registration with the opening, and which, when further revolution has been effected, will cause the closing of the first opening and the uncovering of the second opening for the registration of the numbers of the second row.

Further objects and advantages will appear in the following specification, and the novel features of the device will be particularly pointed out in the appended claims.

Figure 9:
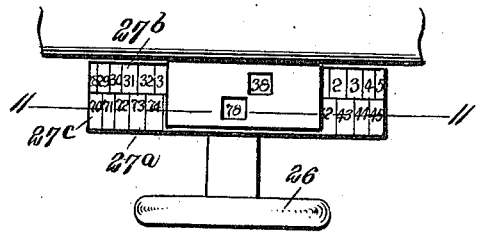
Figure 10:
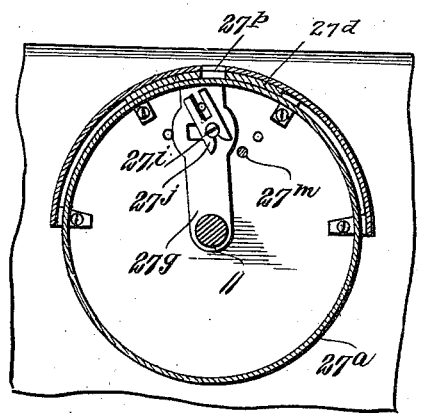
Figure 11:
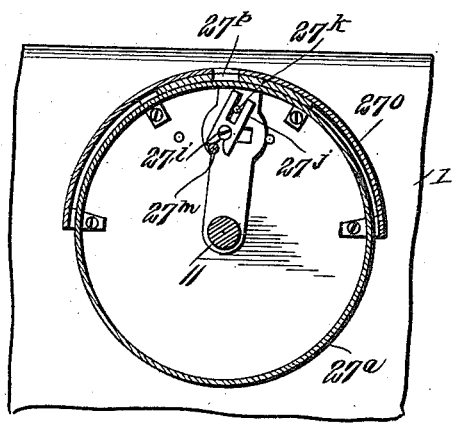
Figure 12:
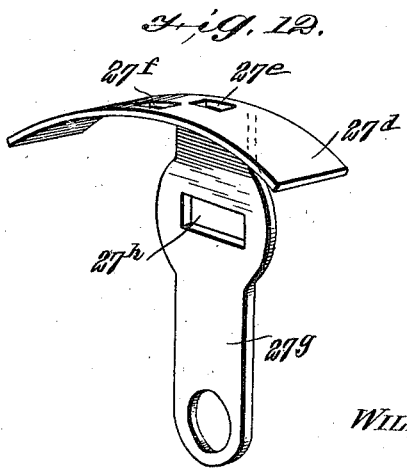

My invention is illustrated in the accompanying drawings, in which similar reference characters indicate like parts in the several views, and in which:

Figure 1 is a front view showing one embodiment of my invention. Fig. 2 is a rear view of the device, the back portion of the casing being removed, Fig. 3 is a horizontal section along the line 3—3 of Fig. 1, Fig. 4 is a horizontal section along the line 4—4 of Fig. 1, Fig. 5 is an enlarged vertical section along the line 5—5 of Fig. 1, Fig. 6 is a detail front view of a portion of the cabinet, certain parts being in section, Fig. 7 is a perspective view of the drawer operating arm, Figs. 8 and 9 are plan views of the number wheels, the arc-shaped top being removed, Fig. 10 is a vertical section along the line 10—10 of Fig. 8, Fig. 11 is a vertical section along the line 11—11 of Fig. 9, and Fig. 12 is a perspective view of the oscillating plate for covering or uncovering the numbers on the number wheel.

In carrying out my invention, I provide a rectangular frame or casing 1, of greater height than width, as shown in the drawings. The frame is provided with a hollow base 2, having a false bottom 3, between which, and the real bottom 4 is disposed a number card 5, (as shown in Fig. 5), the purpose of which will be explained hereinafter.

In the drawings, I have shown three rows of superposed drawers 6, although it will be understood that any number of rows might be used. These drawers are preferably made of metal, and are formed in the shape best shown in Figs. 3 and 5. Each drawer is provided near its forward end with a depressed portion $6^a$, and near its rear end with a member $6^b$, which is stamped out of the bottom of the drawer, bent upwardly and then inwardly. Each drawer is also provided with an opening $6^c$ in its bottom. Each row of drawers is carried by the movable frame or casing 7, which is provided with a handle 8 at its lower edge so that the frame with its drawers may be drawn bodily from the main casing 1. The division strips 9 separate the side frames from the center frame so that each row of drawers is in a compartment by itself. The sides of the drawers 6 are inclined as shown at $6^d$ in Fig. 6, and their bottoms rest on shoulders $10^a$ formed on a side strip 10 secured to the sides of the individual frames 7. This construction permits each drawer to slide freely without interfering with the adjacent drawers. From an inspection of Fig. 5, it will be observed that the stop member $6^b$ of one drawer will engage the depressed portion $6^a$ of the drawer immediately above it so as to limit its outward movement. Each of the drawers is provided at its front end with a cut-away portion $6^k$ which serves the double purpose of permitting the withdrawal of the drawer from the front and also allows clearance for the stop member $6^a$ so that each drawer can be pulled or pushed forwardly without interfering with the one above it.

In the bottom part of the casing 1 I arrange a series of rotatable rods or shafts 11. Each of these shafts is provided at its rear end with a sprocket wheel 12. The sprocket chains 13 pass around the sprockets 12, and over idler sprockets 14 at the top of the casing. Disposed in line with one side of each of the chains 13 are the rods 15, which extend from the top to the bottom of the casing, and are revoluble about their axes, as a center. Each of the rods 15 is provided with a device such as that shown in Fig. 7. This consists of a yoke 16 having a laterally extending arm 17 secured to it so that when the rod 15 is turned, the arm 17 is carried around with it.

Disposed upon the rod 15 between the arms of the yoke 16 is a plate 18 provided with openings $18^a$. A removable plate 19 is provided with similar openings $19^a$ adapted to register with the openings $18^a$ and is arranged to clamp the chain 13 securely to the plate 18. This may be accomplished by means of the bolts $18^x$ and nuts $18^y$ in the manner shown in Fig. 2, so that when the chain is moved, the yoke 16, together with the arm 17 will be carried up or down. A counter-weight 24 is secured to the chain on the opposite side of the sprocket wheel, and serves to balance the movable arm 17 and the yoke 16.

Each of the rods 15 is provided with an arm 20 at its lower end, which is pivotally connected by means of the link 21 to a bell-crank lever 22 pivoted at 23 to the false bottom 3. The front part of the lever 22 is flattened so as to provide a handle $22^a$. The lever 22 is kept normally in the position shown at the right and left of Figs. 3 and 4 by means of the spring 25, which is attached to the false bottom, but may be moved into the position shown at the center of the figures against the tension of the spring.

Secured to the front end of each of the shafts 11, is a hand wheel 26 for turning the same, and between the hand wheel and the casing 1 is a number wheel 27. The construction of this number wheel is best set forth in Figs. 8 to 12, inclusive. It consists of a cylinder $27^a$ having thereon two rows of numbers, $27^b$ and $27^c$, (see Figs. 8 and 9). Loosely disposed on the shaft 11 is an oscillating arc-shaped plate $27^d$ provided with an opening $27^e$ arranged to register with the row $27^b$, and the opening $27^f$ arranged to register with the row $27^c$. The plate $27^d$ is mounted on the shaft 11 by means of the arm $27^g$. The latter has an opening $27^h$ through which the screw $27^i$ projects, (see Fig. 5). The latter loosely holds in place an oscillating member $27^j$ which is slotted at both ends, the upper slot being arranged to straddle the pin $27^k$ carried by the arm $27^g$, and the lower slot being arranged to engage a pin $27^m$ carried by the front part of the cylinder $27^a$. The plate $27^d$ is disposed so as to project over the upper part of the cylinder, $27^a$, while an exterior arc-shaped plate $27^o$ having a central opening $27^p$ is secured to the main casing 1.

The inner circle $27^b$ is divided into a series of numbered divisions corresponding to one-half of the drawers in the row immediately above it, while the outer circle $27^c$ has numbers corresponding to the other half of the row. As the numbered cylinders revolve, the pin $27^m$ will engage the projections on the lower part on the member $27^j$, thereby turning the latter about its pivot $27^i$, and causing the shifting of the arm $27^g$ and therefore of the plate $27^d$ so as to bring either one of the openings $27^e$ or $27^f$ into registration with the opening $27^p$ in the plate $27^o$. The cylinder may therefore be turned one revolution and the numbers will be exposed in the opening $27^e$. On continuing the revolution of the cylinder, however, the pin $27^m$ will cause the shifting of the plate so as to close the opening $27^e$ and to bring the opening $27^f$ into registration with the opening $27^p$, thereby exposing the outer row of figures. It will thus be seen that only one row of the two on the number cylinder is exposed at one time, and as the numbers are arranged consecutively, one cylinder will provide for twice the numbers that could be used with only one registering opening, and one row of numbers.

From the foregoing description of the various parts of the device, the operation thereof may be readily understood. In using the device, each customer's bills are placed in a particular drawer. The customer is given a number, as for instance, 25, and this number is recorded on the sheet 5, disposed in the bottom of the device, opposite the customer's name, for reference in case his number should not be known. If a customer desires a statement of his account, the merchant looks at the card to ascertain the customer's number, unless he remembers it, and then turns the hand wheel 26 so as to bring the number designated into view, in the opening $27^p$. The revolution of the shaft 11 and the sprocket wheels 12 causes the travel of the chain 13 and the upward movement of the arm 17, a distance corresponding to the distance through which the wheel is turned, i. e., until the arm 17 is immediately behind the drawer 25. The lever $22^a$ is now pressed to the left in the manner indicated in the central rows of figures 3 and 4. This causes a quarter turn of the rod 15 and of the arm 17, and the drawer is forced forward into the position shown in Fig. 5 when the bills may be taken therefrom, and presented to the customer. It will thus be seen that there will be no necessity of running over an index, and then hunting for the customer's account in the ledger, but by merely turning the hand wheel to bring the proper number in view, and pressing the lever, bills already made out may be taken from the drawer which is thrust forward. Immediately on the release of the lever 22ª, the arm 17 swings backward into its original position, so that the drawer can be pushed in.

The frames containing the rows of drawers may be removed bodily from the casing 1, and put into the safe at night.

Obviously more or less rows of drawers might be used, without departing in the least from the spirit of the invention.

I claim:

1. A filing cabinet comprising a frame, a plurality of drawers therein, a number wheel provided with parts corresponding to the drawers and arranged to be exposed singly and a drawer opening device adapted to be brought into operative relation with any of said drawers by a movement of the number wheel.

2. A filing cabinet comprising a main casing, a frame arranged to fit into said main casing, a plurality of superposed drawers carried by said frame, a number wheel provided with numbers corresponding to the drawers arranged to be exposed singly, a drawer opening device and means actuated by the movement of the number wheel for bringing said drawer opening device into operative relation with the drawer corresponding with the number exposed.

3. A filing cabinet comprising a main casing, a removable frame arranged to fit into said main casing, a plurality of superposed drawers carried by said frame, a number wheel having numbers corresponding to the drawers, means for exposing the numbers singly, a single lever arm for moving any of the drawers, means actuated by the movement of the wheel for bringing the lever arm into operative relation with the drawer corresponding to the number exposed and means for causing the engagement of said lever arm with the drawer for opening the same.

4. A filing cabinet comprising a main casing, a removable frame arranged to fit into said main casing, a plurality of superposed drawers carried by said frame, a number wheel having numbers corresponding to the drawers, a plate provided with an opening for exposing a single number, a vertically movable arm adapted to be actuated by a movement of said number wheel, means for moving said arm into operative relation with the drawer corresponding to the number exposed on the number wheel and means for causing a lateral movement of the arm to bring it into engagement with the drawer selected.

5. A filing cabinet comprising a main casing, a removable frame arranged to fit into said main casing, a plurality of superposed drawers carried by said frame, a number wheel having numbers corresponding to the drawers, a plate secured to said main casing and provided with an opening for exposing a number, a vertically extending rod at the rear of said row of drawers, an arm slidably secured to said rod, means controlled by the number wheel for moving said arm up and down the rod, and means for rotating said rod, thereby bringing the arm into engagement with the rear end of the drawer, corresponding to the number exposed on the number wheel so as to push the drawer forward.

6. A filing cabinet comprising a main casing, a removable frame arranged to fit into said main casing, a plurality of superposed drawers carried by said frame, a number wheel having numbers corresponding to the drawers, a plate secured to said casing and provided with an opening for exposing a single number on the number wheel, a vertically extending rod at the rear of said row of drawers, an arm slidably secured to said rod, a sprocket wheel on the number wheel shaft, a chain arranged to be moved by said sprocket wheel, said arm being secured to said chain and being moved by the chain to a position behind the drawer corresponding to the number exposed on the number wheel, and means for rotating said arm so as to bring it into engagement with the rear end of the drawer, thereby pushing the latter forward.

7. In a filing cabinet, a main casing, a removable frame arranged to fit into said main casing, a plurality of superposed drawers carried by said frame, a shaft mounted in said casing beneath said superposed drawers, a number wheel on the front end of said shaft and a sprocket wheel on the rear end, a second sprocket wheel mounted at the top of said casing, a sprocket chain arranged to pass around said sprocket wheels, a vertically disposed rod immediately adjacent the sprocket chain, an arm slidably secured to said rod, and attached to said chain, a lever carried by said casing, and a link connecting said lever with said vertically disposed rod for rotating the latter.

8. In a filing cabinet, a main casing, a removable frame arranged to fit into said main casing, a plurality of superposed drawers carried by said frame, a shaft mounted in said casing beneath said superposed drawers, a number wheel on the front end of said shaft and a sprocket wheel on the rear end, a second sprocket wheel mounted at the top of said casing, a sprocket chain arranged to pass around said sprocket wheels, a vertically disposed rod immediately adjacent the sprocket chain, and provided with a rigid arm, an arm slidably secured to said rod and attached to said chain, a bell-crank lever pivotally mounted on said casing, a link connecting said bell-crank lever with said rigid arm on said vertically disposed rod, and a spring secured to said bell-crank lever for holding said movable arm in a normally inoperative position, said movable arm being arranged to engage the rear end of a drawer when the bell-crank lever is turned, and to push the drawer forward.

WILLIAM A. HARRIS.

Witnesses:
SOLON C. KEMON,
L. A. STANLEY.